Aug. 16, 1949.　　　W. R. TUCKER　　　2,479,433
MOLDING MACHINE
Filed Dec. 13, 1946　　　3 Sheets-Sheet 1

INVENTOR
WARREN R. TUCKER
BY
Toulmin & Toulmin
ATTORNEYS

Aug. 16, 1949.   W. R. TUCKER   2,479,433
MOLDING MACHINE
Filed Dec. 13, 1946   3 Sheets-Sheet 2

INVENTOR
WARREN R. TUCKER
BY
Toulmin & Toulmin
ATTORNEYS

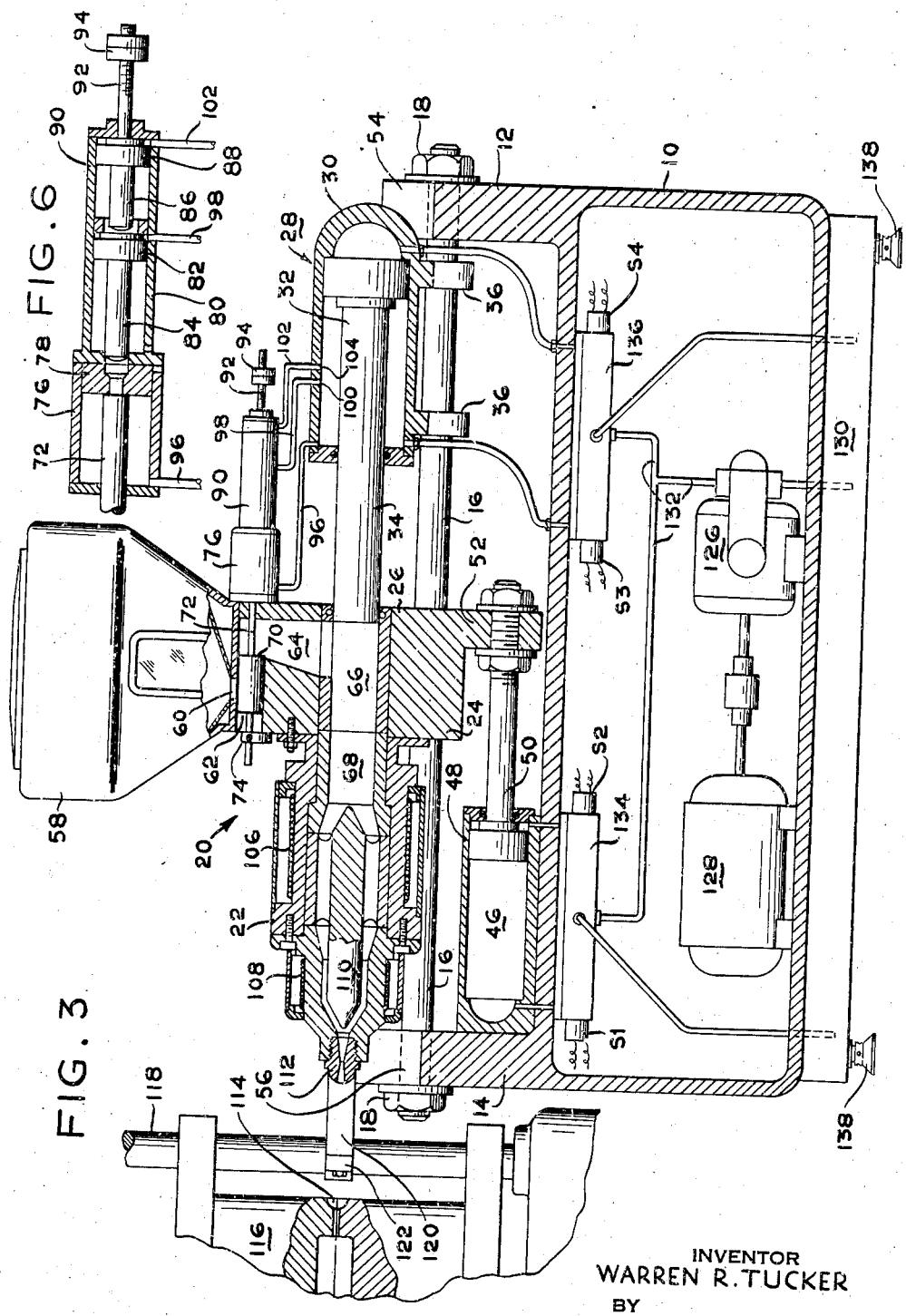

Patented Aug. 16, 1949

2,479,433

UNITED STATES PATENT OFFICE 2,479,433

MOLDING MACHINE

Warren R. Tucker, Dayton, Ohio, assignor to H-P-M Development Corporation, Wilmington, Del., a corporation of Delaware Application December 13, 1946, Serial No. 715,917

4 Claims. (Cl. 18—30)

This invention relates to extrusion apparatus, and particularly to an extrusion unit adapted for being employed with separate die clamping means.

The usual molding equipment comprises a die clamping means and an extrusion means integrally mounted on a suitable bed member. This requires that the molds into which the extrusion units discharge molding material must be designed to be received in the clamping section of the machine, and molds which have been designed for other purposes are ordinarily not usable in a machine of this type.

One of the objects of the present invention is the provision of an extrusion unit adapted for being employed with any type of mold clamping means so that substantially all kinds of molds or dies can be utilized.

Another object of the present invention is the provision of an integral extrusion unit having means for detachably associating the said unit with an auxiliary mold clamping device.

A still further object is the provision of a complete extrusion unit including automatic feeding means, a heating chamber, an extrusion means for forcing the molding material through the heating chamber, together with the suitable means for connecting the extrusion unit with an auxiliary mold clamping apparatus.

Another object of this invention is to provide an improved control mechanism for the automatic feeding device in order to measure the molding material into the heating chamber.

These and other objects and advantages will become more apparent upon reference to the following description taken in connection with the attached drawings in which:

Figure 3 is a longitudinal vertical section showing the working parts of the unit;

Figure 5 is a sectional view taken substantially on the line 5—5 of Figure 1; and Figure 6 is a sectional view through the feed actuating device and is taken substantially on the line 6—6 of Figure 2.

General arrangement

Figure 1:
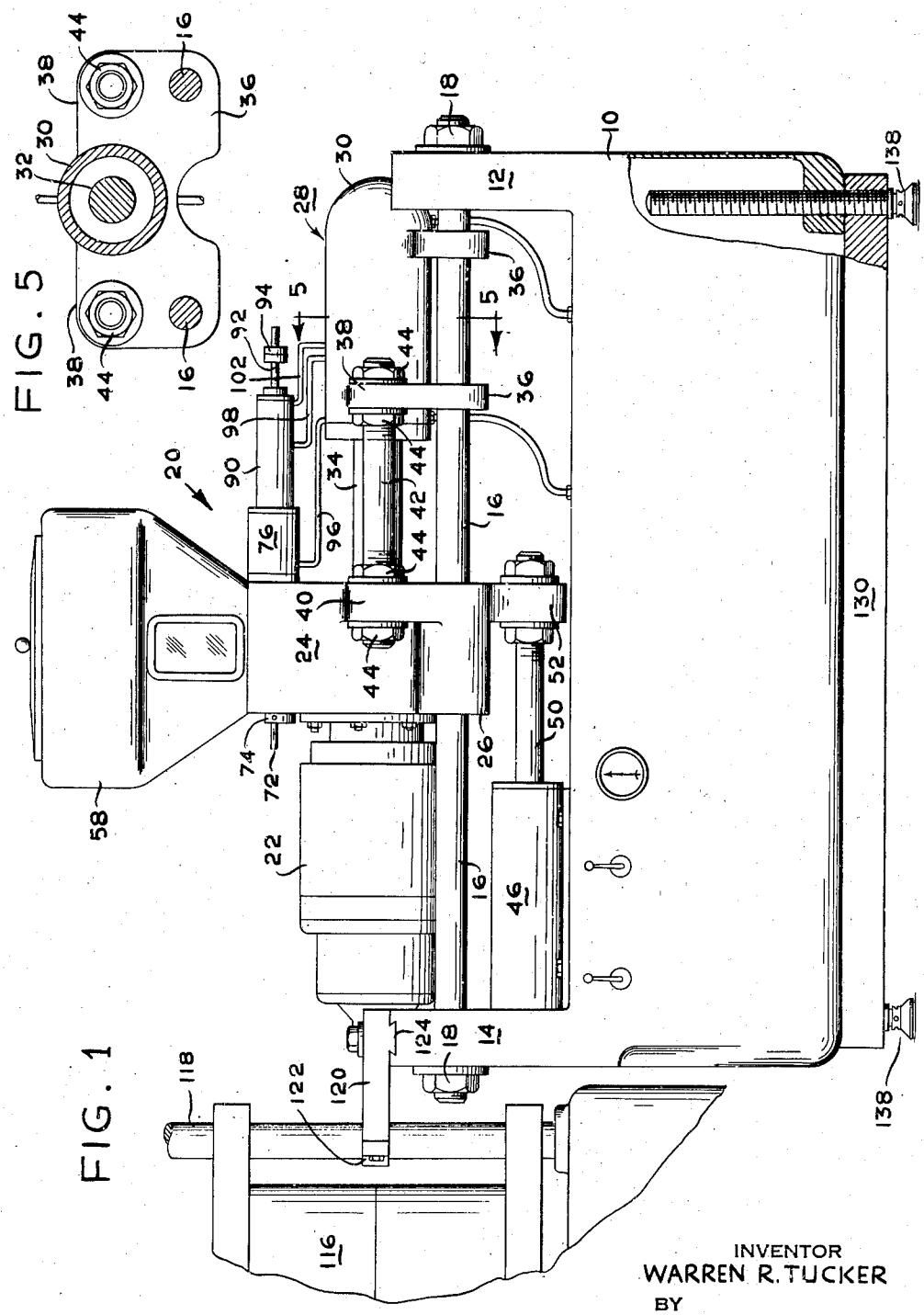
Figure 1 is a side elevation of an extrusion unit according to this invention.
Figure 2:
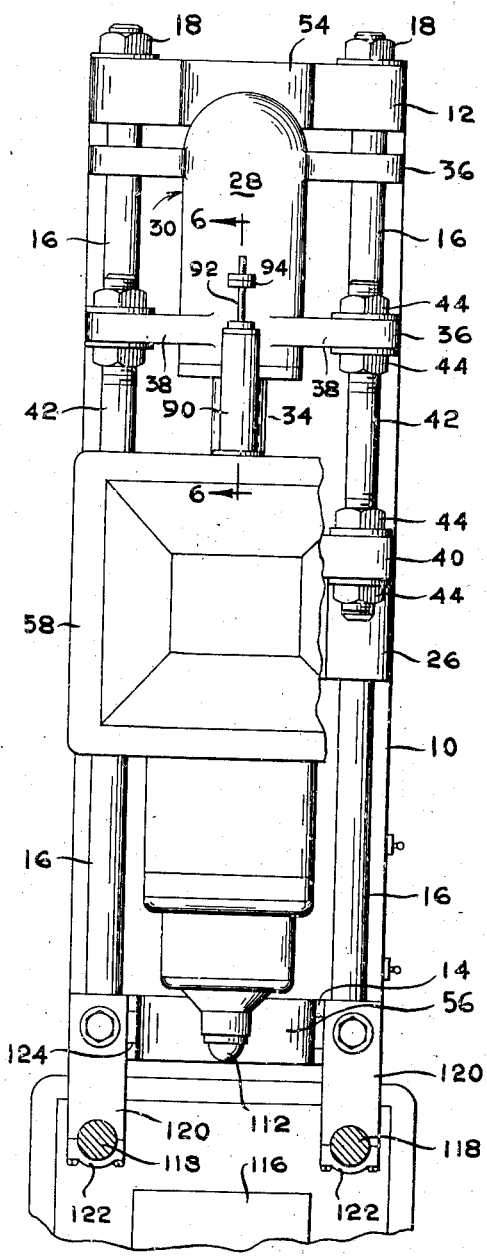
Figure 2 is a plan view of the unit.
Figure 4:
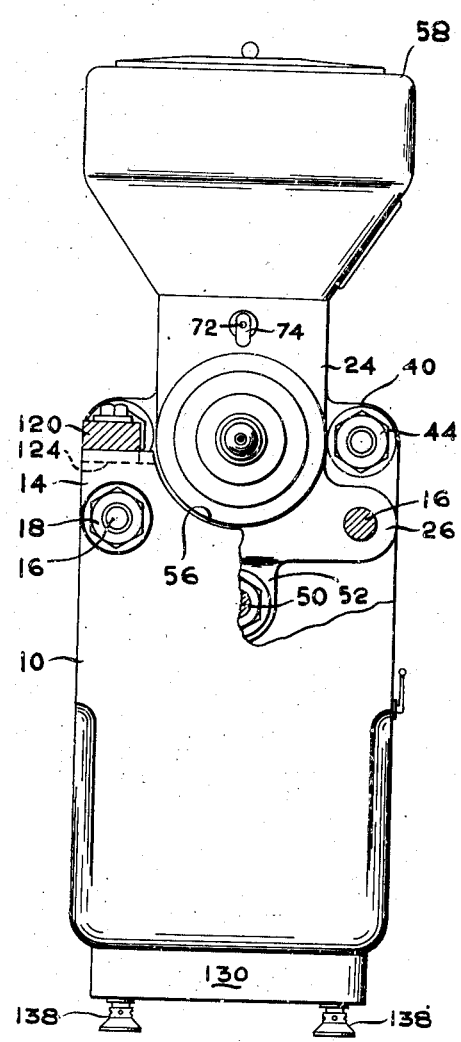
Figure 4 is an end elevation of the unit partly broken away.

According to this invention a compact extrusion unit is provided which comprises a bed member having mounted thereon an extruding apparatus comprising a heating chamber, an extrusion plunger for forcing plasticized material through the heating chamber and a hopper for supplying molding material to the said chamber. This unit is slidably mounted on strain rods rigidly carried on the bed member, and a fluid motor is provided for reciprocating the extrusion unit on the strain rods in order to bring the discharge end of the heating chamber into engagement with the mold or die.

Automatic means are provided for measuring material from the hopper into the heating chamber and according to this invention this feed mechanism is preferably hydraulically actuated by pressure fluid from the actuating motor of the extrusion plunger. Fluid is supplied to the actuating motor for the extrusion plunger, and to the motor for reciprocating the extrusion unit by a fluid pump mounted in the bed member.

The mold or die into which the material is extruded or injected is clamped by a press means independent from the extrusion device of this invention. In order firmly to seat the extrusion end of the heating chamber against the mold or die being filled, there is provided clamping means by which the extrusion device may be rigidly but detachably secured to the mold clamping press.

Structural arrangement

Referring to the drawings, the bed member of the extrusion member of this invention is indicated at 10 and it will be seen to comprise an upstanding flange 12 at the rear end thereof and a similar flange 14 at the front end thereof. These flanges may be integral with the bed member, or rigidly secured thereto in any other suitable manner. Extending between the flanges 12 and 14 are a pair of strain rods 16 which may be retained rigidly in position by the nuts 18 on either end thereof. The strain rods 16 slidably receive the extrusion unit proper, which is generally indicated by the reference numeral 20 which is mounted on a block 24. The block 24 comprises the laterally extending portions 26 which slidably receive the strain rods 16 and which support both the block 24 and the heating chamber 22.

Spaced from the block 24 on the opposite side thereof from the heating chamber 22 is the extrusion motor 28 which comprises the cylinder 30 and the double acting ram 32 which extends into the block 24 and acts as the extrusion plunger. Optionally, the extruding end 34 of the plunger 32 may be separate therefrom and connected with the said plunger by means of a suitable flexible connection, but for the purposes of illustration the said plunger and the portion 34 are shown as a single member.

The cylinder 30 has the laterally extending portions 36 thereon which slidably receive the strain rods 16 similarly as the portions 26 of the block 24. In order to interconnect the motor 28 and the block 24, and to absorb the thrust of the motor 28 during extrusion, the motor cylinder has the lugs 38 thereon and the block 24 has the lugs 40 through which pass the strain rods 42. By means of the nuts 44 the strain rods are made rigid with both the motor 28 and the block 24.

The entire extrusion unit 20 is reciprocated on the strain rods 16 by a fluid motor 46 which comprises the cylinder 48 and the double acting ram 50 which is connected with the block 24 through the depending projection 52 thereon. Reference to Figure 3 will reveal that the upstanding portion 12 at the rear of the bed 10 is recessed as at 54 while the upstanding portion 14 at the forward end of the bed is recessed as at 56 in order to receive the cylinder 30 and the heating chamber 22, respectively, as the extrusion unit is reciprocated on the rods 16.

The block 24 has mounted on its upper surface a hopper 58 which opens through an aperture 60 into a feed chamber 62. The feed chamber, in turn, opens through a passage 64 into the bore 66 in the block 24 which communicates with the passage 68 extending through the heating chamber 22.

For displacing material from the feed chamber 62 which falls therein from the hopper 58 through the aperture 60, there is provided a piston 70 which is mounted on a piston rod 72 extending out both sides of the block 24. On the left side of the block 24 there is a collar 74 adjustably secured to the rod 72 and which operates to limit the rightward movement of the piston 70. On the right side of the block 24 there is mounted a piston cylinder arrangement best seen in Figure 6. In Figure 6 it will be noted that the rod 72 extends into a cylinder 76 and therein is connected with a piston 78. The right end of the cylinder 76 is open and is connected with a cylinder 80 within which is reciprocable a piston 82 that has a projection 84 adapted for abutting the piston 78. Similarly, the right end of the cylinder 80 is open to receive the plunger 86 of the piston 88 which is reciprocable in the cylinder 90. Extending from the right side of the piston 78 is a rod 92 which has adjustably mounted thereon the stopnuts 94. It will be noted that the travel of the piston 82 in its cylinder 80 is substantially equal to the maximum travel of the piston 88 in the cylinder 76, but that the travel of the piston 78 in its cylinder 90 is substantially shorter.

A conduit 96 connects the cylinder 76 on the left side of the piston 78 with the retraction side of the extrusion plunger 32. Another conduit 98 connects the cylinder 80 on the right hand side of the piston 82 with the cylinder 30 at the point marked 100 in Figure 3. Similarly, the right side of the cylinder 90 is connected by a conduit 102 with the point indicated at 104, in Figure 3. It will be noted that the point 100 is in such a position that it will communicate with the right side of the plunger 32 when the said plunger has reached its maximum forward position, while the point 104 will communicate with the right side of the plunger substantially before it has reached its maximum forward stroke.

The heating chamber 22 may be of any suitable type, but it is preferred to use a chamber having a pair of electric heating elements as at 106 and 108 which heat the chamber and thereby plasticize the material being forced therethrough and around the torpedo or spreader 110. The discharge end of the extrusion member terminates in a nozzle member 112 which is adapted for being received in the clamped mold 116.

The mold 116 may be clamped in any suitable clamping device and the clamping press illustrated comprises the vertical strain rods 118. To connect the extrusion unit with the mold clamping press, there are adjustably carried on the projection 14 of the bed the bars 120 which have clamping means as at 122 for rigidly securing the said bars to the rods 118. Preferably, the bars 120 are laterally adjustable on the portion 14 as by the dovetail indicated at 124.

The supply of actuating fluid for the extrusion motor 30 and the shifting motors 46 comprises a fluid pump 126 mounted in a cavity in the bed 10 and being drivingly connected with the drive motor 128. The pump draws fluid from a reservoir 130 and discharges pressure fluid from conduit 132 to the inlets of the reversing valves 134 and 136 for the motors 46 and 30 respectively. Suitable means such as the solenoids indicated at S1, S2, S3 and S4 may be provided for actuating the movable elements of the valves 134 and 136.

*Operation*

The mold or die in which workpieces are to be formed is first mounted in the mold clamping piece. Thereafter, the extrusion unit is clamped to the strain rods 118 of the press and, if necessary, an adjustment of the height of the heating chamber is made by the screw-jacks indicated at 138. Then, a supply of molding material is fed into the heating chamber and permitted to become plasticized. The apparatus is now ready to carry out a molding cycle.

In carrying out a molding cycle, the motor 46 is first actuated to move the extrusion unit 20 leftwardly to seat the nozzle 112 in the nozzle recess 114. Thereafter, the extrusion plunger 32 is actuated by shifting the valve 136 in order to force molding material from the heating chamber through the nozzle and into the mold cavity. When the mold cavity is filled, the extrusion plunger and extrusion unit are both retracted, the clamped mold is opened, and the completed workpiece is ejected.

During the retraction stroke of the plunger 32, the fluid which is acting on the left side of the said plunger acts through the conduit 96 and moves the piston 78 toward the right through the rod 72, this moves the piston 70 to the right and dislodges molding material from the feed chamber 62 through the passage 66. On the following advancing stroke of the plunger 32, when the said plunger is moved leftwardly until the end of the conduit 102 communicates with the right side of the said plunger, the pressure fluid acting on the said plunger will act through the conduit 102 and move the piston 88 leftwardly until its travel is halted by the stop-nuts 94. This movement of the piston 88 causes the piston 82 also to move to the left and, through the plunger 84 thereon, to move the piston 78 to the left. This actuates the rod 72 and the piston 70 to the left and uncovers a predetermined portion of the aperture 60 thereby permitting a predetermined amount of material to fall from the hopper 58 into the feed chamber 62. The stop-nuts 94 are preferably adjusted so that this quantity is slightly less than that required for a molding cycle so that there is no tendency for excess material to accumulate in the heating chamber. In order to make up for the deficit of molding material which will accumulate over a number of molding cycles, a predetermined further advancing movement of the plunger 32 will uncover the end of the conduit 98 and thereby actuate the piston 88 leftwardly. The piston 82, having a longer stroke than the piston 88, will move the piston 78 and the piston 70 further to the left and thus uncover a greater area of the aperture 60. This permits a greater amount of molding material to fall into the feed chamber 12, thus providing for a compensating increase in feed whenever the plunger 32 strokes beyond a predetermined amount.

It will be seen that this invention provides for an improved and a highly compact extrusion unit adapted for carrying out molding cycles in a manner to produce high quality workpieces, and being adaptable to any of several types of mold clamping devices such as the standard type of press ordinarily encountered in machine shops. The device of this invention is more inexpensive than the usual type molding machine and may be relatively easily transported in order to utilize the mold clamping means available.

It will be understood that this invention is susceptible to modification in order to adopt it to different usages and conditions and, accordingly, it is desired to comprehend such modifications within this invention as may fall within the scope of the appended claims.

I claim:

1. In a portable molding machine; a bed; adjustable elevators at each corner of said bed; an upstanding part of each end of said bed longitudinally extending guide means on said bed extending through and connected to said upstanding parts; an injector unit slidable on said guide means and comprising a heating chamber, a feed hopper, a reciprocable injection plunger and a feeding means; motor means for reciprocating said injector on said guide means; and means interlocking said injection plunger and said feeding means for controlling the operation of the latter in response to the reciprocation of the former; and means on the said upstanding part of the bed adjacent the heating chamber for detachably securing said bed to an independent mold clamping device.

2. In combination in a molding machine having a heating chamber, an injection plunger reciprocable therein, and a supply hopper for supplying material to said chamber; a feed plunger; fluid operable advancing and retracting areas for said injection plunger; fluid operable areas for actuating said feed plunger; and means responsive to a predetermined advancing movement of said injection plunger for hydraulically connecting one of said fluid operable areas with said advancing area.

3. In a feeding device for a molding machine having a heating chamber with a feed opening and a hopper with a discharge opening laterally offset from said feed opening, and an injection plunger having fluid operable advancing and retracting areas; a member movable in one direction to uncover said discharge opening, and in the other direction to move material dropped through said discharge opening into said feed opening; a first area on said member continuously connected with the retracting area of said plunger and operable to move said member in said other direction; and second and third other areas on said member arranged to act therein in opposition to said first area; and means responsive to predetermined advancing movements of said injection plunger for consecutively hydraulically connecting said second and third areas with said advancing area, said last mentioned means being effective as said injection plunger approaches the limit of its advancing travel.

4. In a feeding device for a molding machine having a heating chamber with a feed opening and a hopper with a discharge opening laterally offset from said feed opening, and an injection plunger having fluid operable advancing and retracting areas; a member movable in one direction to uncover said discharge opening, and in the other direction to move material dropped through said discharge opening into said feed opening; a first area on said member continuously connected with the retracting area of said plunger and operable to move said member in said other direction; second and third other areas on said member opposed to said first area and adapted for moving said member different distances in the said one direction; and means operable automatically as said injection plunger moves in its advancing direction for successively connecting said second and third areas with the advancing area of said injection plunger for moving said member in its material moving direction.

WARREN R. TUCKER.

REFERENCES CITED

The following references are of record in the file of this patent:

UNITED STATES PATENTS

| Number | Name | Date |
|---|---|---|
| 1,910,284 | Fiegel et al. | May 23, 1933 |
| 2,293,304 | Muller et al. | Aug. 18, 1942 |
| 2,333,056 | Thoreson et al. | Oct. 26, 1943 |
| 2,360,000 | Lawyer | Oct. 10, 1944 |